United States Patent
Voorman et al.

[11] Patent Number: 6,091,558
[45] Date of Patent: Jul. 18, 2000

[54] DEVICE FOR WRITE COMPENSATION IN MAGNETIC MEDIA RECORDING

[75] Inventors: Johannes O. Voorman; Johannes W. M. Bergmans; Hendrik J. Pothast, all of Eindhoven, Netherlands

[73] Assignee: U.S. Philips Corporation, New York, N.Y.

[21] Appl. No.: 08/909,919

[22] Filed: Aug. 12, 1997

[30] Foreign Application Priority Data

Sep. 2, 1996 [EP] European Pat. Off. ............ 96202427

[51] Int. Cl.[7] ............................ G11B 5/09; G11B 5/035
[52] U.S. Cl. .................................. 360/46; 360/65
[58] Field of Search .................. 360/45, 46, 65, 360/66; 327/553

[56] References Cited

U.S. PATENT DOCUMENTS

| | | | |
|---|---|---|---|
| 4,607,295 | 8/1986 | Uno | 360/45 |
| 4,964,107 | 10/1990 | Galbraith et al. | 368/120 |
| 5,325,241 | 6/1994 | Mattison et al. | 360/45 |
| 5,381,359 | 1/1995 | Abbott et al. | 364/724.19 |
| 5,426,541 | 6/1995 | Coker et al. | 360/65 |
| 5,583,705 | 12/1996 | Ziperovich et al. | 360/45 |
| 5,734,680 | 3/1998 | Moore et al. | 375/263 |
| 5,870,431 | 2/1999 | Easton et al. | 375/230 |

OTHER PUBLICATIONS

"Characterization of the Read/Write Process for Magnetic Recording" by Dean Palmer, John Hong, David Stanek and Roger Wood in IEEE Transactions on Magnetics, vol. 31, No. 2, Mar. 1995, pp. 1071–1076.

"Considerations for High–Data–Rate Recording with Thin–Film Heads" by R. Wood, M. Williams and J. Hong (IEEE Trans. Magn., vol. 26, No. 6, pp. 2954–2959, Nov. 1990.

D. Palmer, P. Ziperovich, R. Wood and T.D. Howell, "Identification of Nonlinear Write Effects Using Pseudorandom Sequences", IEEE Trans. Magn. vol. Mag–23, No. 5, pp. 2377–2379, Sep. 1987.

*Primary Examiner*—Ahmad F Matar
*Assistant Examiner*—Regina Y. Neal

[57] ABSTRACT

A device for write precompensation of data signals to be recorded on a magnetic medium, which device has an input for receiving input data signals and an output for supplying output signals to be recorded, an integrator/limiter circuit which receives the input data signals and which supplies an output signal which is in synchronism with the data signal and whose amplitude varies substantially linearly as a function of time at positions where a signal transition appears in the data signal, which amplitude is limited within a data symbol interval; an adjustable filter which receives the input signals and supplies an output signal whose instantaneous values depend on the pattern of preceding and future signal transitions in the data signal; and a comparator circuit which through comparison of the output signal of the integrator/limiter circuit and the output signal of the filter produces the output signal in which at least some signal transitions of the input data signal can be shifted in time. An important aspect of the present invention is that with the output signal dt an arbitrary number of desired time shifts can be obtained rather than that, as in the prior art, only a choice can be made from a limited number of delay values.

16 Claims, 3 Drawing Sheets

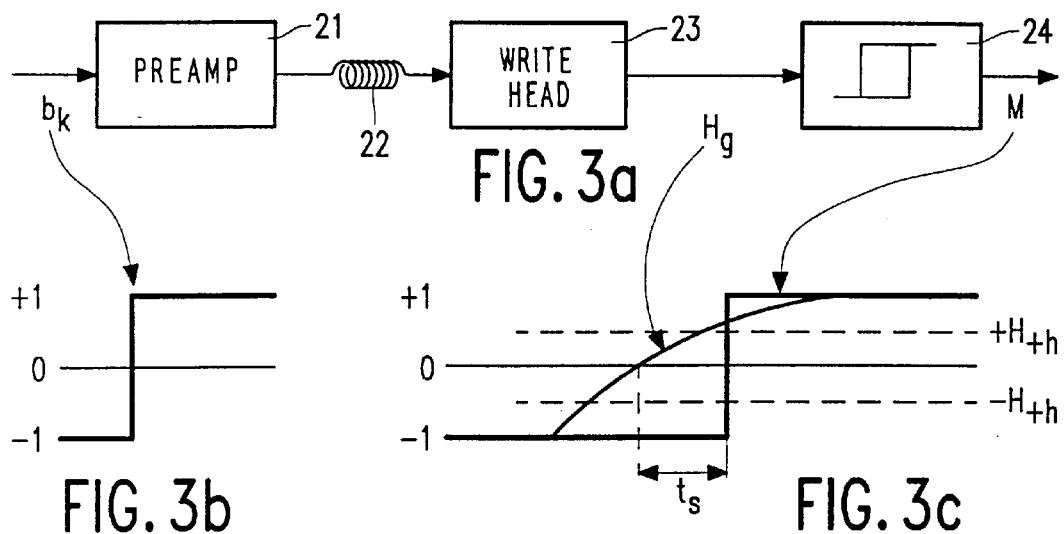
FIG. 3a
FIG. 3b
FIG. 3c
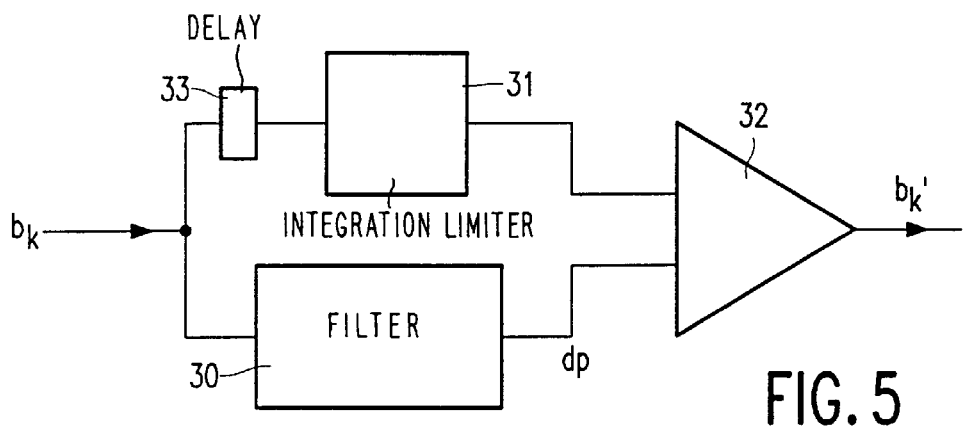
FIG. 5
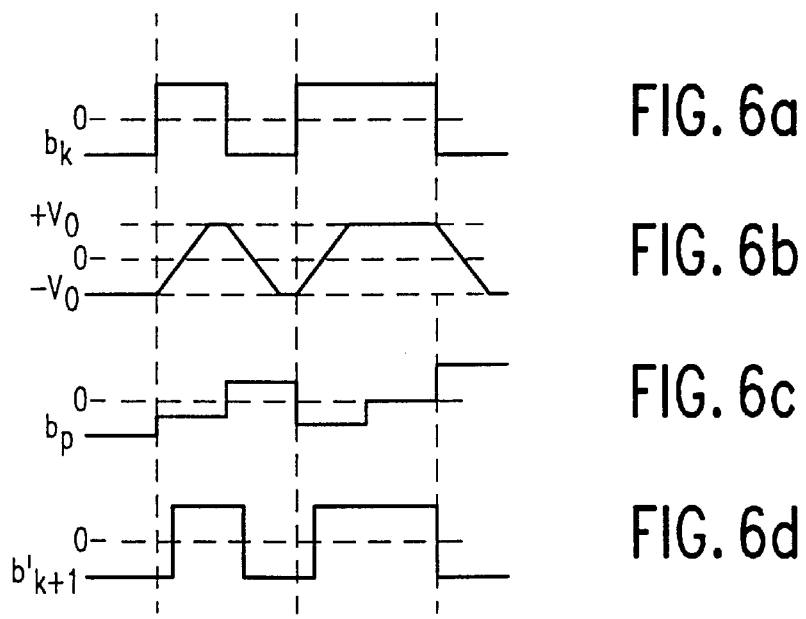
FIG. 6a
FIG. 6b
FIG. 6c
FIG. 6d

DEVICE FOR WRITE COMPENSATION IN MAGNETIC MEDIA RECORDING

BACKGROUND OF THE INVENTION

1. Field of the Invention

The invention relates to a device for write precompensation of data signals to be recorded on a magnetic medium, which device has an input for receiving input data signals and an output for supplying output data signals to be recorded, at least some of the signal transitions in these output data signals being delayed with respect to the corresponding signal transitions in the input data signal.

2. Description of Related Art

In the high-density recording of data on magnetic media non-linear bit shifts are produced when certain data patterns occur. These bit shifts are mainly caused by demagnetization effects component separation mechanism, i.e. due to the fact that the magnetic medium "opposes" the recording of a sign reversal in the bit stream, particularly when a plurality of bits of the same sign precede a bit of an opposite sign. This effect manifests itself in that a sign reversal is recorded too late or too early, as a result of which bits are recorded which are too short or too long, respectively. Such an inaccuracy in the length of a recorded bit is highly undesirable, particularly in the case of high recording and read densities, because the reliability of the bit detection in the read signal is then reduced significantly.

It is known that said effect can be precluded at least partly by the use of write precompensation, which means that a sign reversal to be recorded is either advanced or delayed depending on the value of a number of preceding bits. It is also known to consider for this purpose merely the last preceding bit, referred to as first-order precompensation, or the last two preceding bits, referred to as second-order precompensation. Recently, it has also been proposed to apply a third-order precompensation.

U.S. Pat. No. 4,607,295 describes a device which comprises a transversal filter and by means of which it is decided, depending on the sign of two preceding bits, not to delay a bit to be recorded or to record this bit with a first or a second fixed delay.

U.S. Pat. No. 4,964,107 describes a device by means of which it is decided, depending on the sign of two preceding bits, whether or not to delay the bit to be recorded. Here, the selected delay also depends on the location where the data is recorded on a magnetic disc, for which purpose a choice can be made from eight delay values.

Finally, U.S. Pat. No. 5,325,241 describes a write precompensation device in which the output voltage of an integrator, which is formed by a capacitance, is compared with three voltage values. Depending on which of the three voltage values is equal to the integrator voltage a bit to be recorded is not delayed, or delayed by a first time, or delayed by a second time.

A drawback of these known write precompensation devices is that they only permit a very limited number of delays to be chosen for the compensation of non-linear bit shifts but in this case allowance is made for only a very limited number of preceding bits.

Another effect which occurs in the high-density recording of data on magnetic media, besides said non-linear bit shift, is known as "partial erasure". Partial erasure can occur when one bit cell of minimum width is recorded, i.e. a bit cell bounded at both sides by a sign reversal, also called a transition, and can be explained as resulting from the partial overlapping of the boundaries at either side of the bit cell owing to inaccuracies of these boundaries. As a result of partial erasure a recorded bit cannot be detected properly or even not at all due to the reduced magnetization.

In the article "Characterization of the Read/Write Process for Magnetic Recording" by Dean Palmer, John Hong, David Stanek and Roger Wood in IEEE Transactions on Magnetics, vol. 31, no. 2, March 1995, pages 1071–1076, it is proposed to mitigate the effect of partial erasure by moving the two transitions, which bound a single bit cell of minimum width, away from each other by a small amount. By means of the method proposed in said article it is, in fact, ascertained whether there are transitions between the consecutive bits $a_{k-2}$, $a_{k-1}$, $a_k$ and $a_{k+1}$ and, depending on the detected pattern of transitions, the shift of the transitions bounding the bit cell $a_k$ is determined. The practical implementation of this method is fairly intricate.

A third effect which introduces non-linear bit shifts has its root in the limited bandwidth of the recording channel. A transition produces a comparatively slow variation of the magnetic field in the write head by means of which the signals are recorded on the magnetic medium. A reversal of the magnetization of the medium does not occur and recording of the transition is not effected until the magnetic field strength exceeds a given threshold value. At high data rates the overall response to a signal transition extends over many bit intervals and thus influences the recording of the transitions of many subsequent bits. In practice, it has been found that this effect can result in the transitions being shifted relative to one another by an amount of 20% or more of one bit interval.

SUMMARY OF THE INVENTION

It is an object of the invention to improve the known techniques and, more particularly, to provide a device which enables all or at least some of the currently known effects leading to non-linear bit shifts to be substantially eliminated by means of precompensation in a simple manner permitting easy integration.

To this end the invention provides a device of the type defined in the opening paragraph, which is characterized by an integrator/limiter circuit which receives the input data signals and which supplies an output signal which is in synchronism with the data signal and whose amplitude varies substantially linearly as a function of time the amplitude being limited within a data symbol interval; an adjustable filter which receives the input signals and supplies an output signal whose instantaneous values depend on the pattern of preceding and/or future signal transitions in the data signal; and a comparator circuit which through comparison of the output signal of the integrator/limiter circuit and the output signal of the filter produces the output signal in which at least some signal transitions of the input data signal can be shifted in time.

BRIEF DESCRIPTION OF THE DRAWINGS

The invention will now be described in more detail hereinafter with reference to the drawings. In the drawings:

FIGS. 3a–3c elucidate the bit shift caused by bandwidth limiting;

FIG. 5 is a block diagram of an embodiment of the device in accordance with the invention; and FIGS. 6a–6d are waveform diagram of the input and output waveforms of an integrator/limiter circuit and of the output waveform of the comparator as used in the device shown in FIG. 5.

DETAILED DESCRIPTION OF THE PREFERRED EMBODIMENTS

Figure 1:
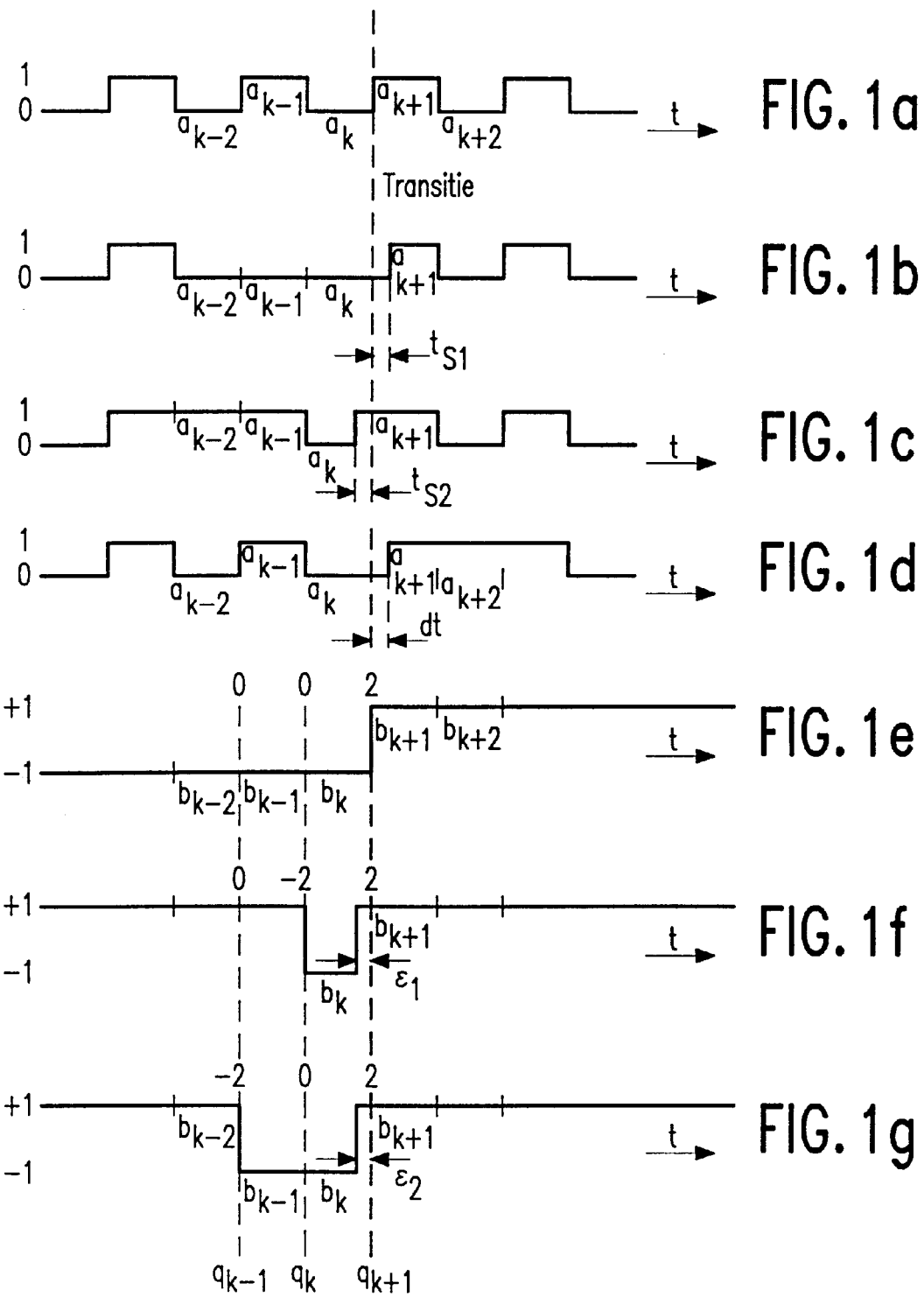
FIGS. 1a–1g illustrate how non-linear bit shifts arise.

In order to explain the three effects which can lead to non-linear bit shifts and which can be mitigated by means of the write precompensation device in accordance with the invention, these three effects will first be described briefly with reference to FIGS. 1, 2 and 4.

First of all, the effect is described that non-linear bit shifts caused by demagnetization effects, i.e. a signal transition to be recorded, referred to hereinafter as a transition, is recorded with a delay when no transition occurred in the preceding symbol interval. Conversely, a transition is recorded prematurely when a transition occurred in the preceding symbol interval and no transition occurred in the symbol interval preceding the last-mentioned interval.

FIG. 1a shows a reference pattern of symbol values as function of the time in which no shift occurs because the transitions appear perfectly regularly. The symbols are referenced $a_{k+j}$, where j=–n ... –1, 0, 1 ... n. The shift of the transition from $a_k$ to $a_{k+1}$ is considered. It is to be noted that for the sake of clarity the bit shifts have been exaggerated in FIGS. 1b–1d.

FIG. 1b shows the situation in which $a_{k-1} \neq a_{k+1}$. The transition shifts to the right by an amount of time $t_{s1}$ because after a "long" period with symbols of a first bit value a transition to the other second bit value is opposed by the magnetic medium and is consequently recorded with a delay. The required precompensation can be expressed mathematically as $dt=-(a_{k+1} \oplus a_{k-1})t_{s1}$.

FIG. 1c shows the situation in which $a_{k-2} \neq a_k$. As a result of this, the transition is shifted to the left by a second amount of time $t_{s2}$ because the magnetic medium records a transition from a second bit value back to a first bit value more easily and hence earlier after a "long" period with symbols of a first bit value. The required precompensation can be expressed as $dt=(a_k \oplus a_{k-2})t_{s2}$.

Figure 2:
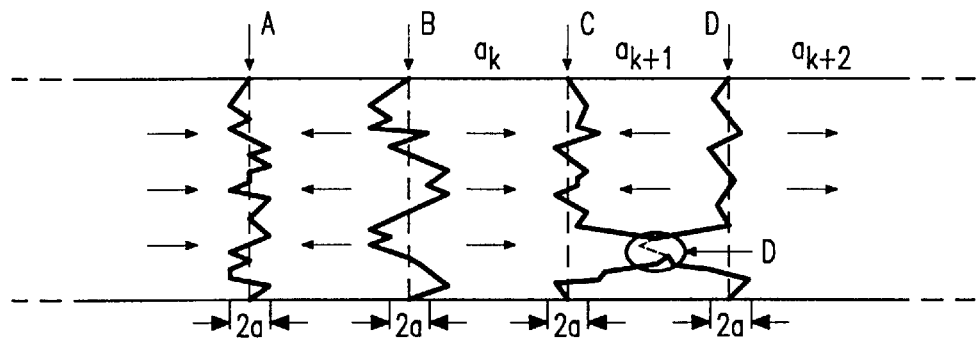
FIG. 2 diagrammatically represents the partial erasure effect.

FIG. 2 shows diagrammatically how the partial erasure effect arises. The principal cause of partial erasure, which occurs mainly in the case recording on thin-film media, is the demagnetization effect exerted on one another by very closely spaced areas with opposite magnetization. The boundary line between adjacent bit cells, which defines a transition, has a zigzag shape as shown in FIGS. 4a, 4b and 4c.

When the width of the bit cells decreases the zigzag boundaries of one bit cell may overlap one another, as at D in FIG. 2, and consequently the bit cell will have only a limited magnetization. Partial erasure occurs only in the case of bit cells having a minimum width, i.e. the two adjacent bit cells have an opposite polarity, so that $a_{k+1}=-a_k=-a_{k+2}$. It is known to compensate partly for partial erasure, particularly at data frequencies well below the Nyquist rate, by moving the transitions bounding a bit cell of minimum width away from one another by an amount $t_{s0}$, as a result of which the overlap of the boundaries shown at D in FIG. 2 is eliminated. For this purpose, the first transition of a minimum-width bit cell should be advanced and the second transition of a minimum-width bit cell should be delayed.

Advancing the first transition from $a_k$ to $a_{k+1}$ only makes sense if $a_{k-1} \neq a_{k+1}$, as shown in FIG. 1b, because otherwise the width of the minimum-width bit cell $a_k$ would be reduced. Therefore, the precompensation required for this can be expressed as $dt=-(a_{k+1} \oplus a_{k-1})t_{s0}$. This precompensation can have the same structure as the precompensation described hereinbefore for the shift $t_{s1}$ in FIG. 1b.

Delaying the last transition of a minimum-width bit cell, such as the transition from $a_k$ to $a_{k+1}$, as shown in FIG. 1d, makes sense only if $a_k \neq a_{k+2}$, as shown in FIG. 1d, because otherwise the width of the minimum-width bit cell $a_{k+1}$ would be reduced. Therefore, the precompensation required for this can be expressed as $dt=(a_{k+2} \oplus a_k)t_{s0}$.

The overall precompensation required for the effects just described is basically a linear combination of the individual contributions and is therefore given by $$dt=(a_{k+2} \oplus a_k)t_{s0}-(a_{k+1} \oplus a_{k-1})(t_{s1}+t_{s0})+(a_k \oplus a_{k-2})t_{s2} \quad (1)$$

It is common practice to work with NRZ data symbols $b_k$ in the alphabet $\{-1,1\}$. These are related, for example, to the data symbols $a_k$ in accordance with $b_k=2a_k-1$, so that $b_k=-1$ if $a_k=0$ and $b_k=1$ if $a_k=1$. Using this relationship between $b_k$ and $a_k$ it is easy to see that $(a_{k+i} \oplus a_{k+j})=(1-b_{k-i}b_{k+j})/2$, so that (1) can be rewritten as:

$$dt=0.5[t_{s2}-t_{s1}]-0.5\ b_{k+2}b_k t_{s0}+0.5\ b_k+b_{k-1}(t_{s0}+t_{s1})-0.5\ b_k b_{k-2} t_{s2} \quad (2)$$

The term $0.5\ [t_{s2}-t_{s1}]$ represents a constant delay, which is henceforth ignored because only the shift of transitions relative to one another is relevant. Since dt represents the shift of a transition between $b_k$ and $b_{k+1}$ it holds that at $b_{k+1}=-b_k$ so that, after dropping the constant delay $0.5[t_{s2}-t_{s1}]$, dt can be written as $$dt=0.5\ b_{k+1}[b_{k+2}t_{s0}+b_{k-1}(t_{s0}+t_{s1})+b_{k-2}t_{s2}] \quad (3)$$

Non-linear bit shifts as a result of the limited bandwidth of the recording channel are now described with reference to FIG. 3. FIG. 3a shows a highly diagrammatic representation of a recording channel for data recording on a magnetic medium. The NRZ data signal $b_k$, which is shown in FIG. 3b, is applied to a preamplifier 21 and, via a connection 22 having a given inductance, to a write head 23. The magnetic field $H_g$ produced by the write head 23 is shown in FIG. 3c. As a result of the hysteresis effect the magnetization M of the medium 24 is not inverted until the magnetic filed strength $H_g$ exceeds a threshold value $H_{th}$. This means that, in fact, the recording of the transition in $b_k$ of FIG. 3b results in an actual magnetic recording by a reversal in the magnetic field at a later instant. Moreover, the lag in the variation of the field strength $H_g$ will often result in $H_g$ not yet having reached its final value when subsequent data transitions appear, which gives rise to interference with the response of $H_g$ to these subsequent transitions. As outlined in the article 'Considerations for High-Data-Rate Recording With Thin-Film Heads' by R. Wood, M. Williams and J. Hong (IEEE Trans. Magn., Vol 26, No. 6, pp. 2954–2959, November 1990) this interference leads to bit shifts similar to the demagnetization effects described above. At high data rates this interference may cover several symbol intervals. In terms of the description of (3) this great memory length requires that bits preceding bk–2 should also contribute to the precompensation. The overall precompensation required consequently has the following structure:

$$dt=b_{k+1}[b_{k+2}c_0+b_{k-1}c_1+b_{k-2}c_2+b_{k-3}c_3 \ldots ] \quad (4)$$

where $c_0$, $c_1$, $c_2$, $c_3$ etc. represent weighting factors which define the degree of precompensation of the non-linear bit shifts as result of the bits $b_{k+2}$, $b_{k-1}$, $b_{k-2}$, $b_{k-3}$ . . . . For the sake of completeness it is to be noted that, in general, these weighting factors are non-negative.

The above description of the value of dt differs from the customary description in the literature of the time shift required in order to achieve first-order and second order precompensation for the bit shifts referred to in the literature as $\epsilon_1$ and $\epsilon_2$. However, it can be demonstrated that there is a direct relationship between $\epsilon_1$ and $\epsilon_2$, on the one hand, and $t_{s1}$ and $t_{s2}$, on the other hand. This will be explained with reference to FIGS. 1e–1g. For a frequently used description of $\epsilon_1$ and $\epsilon_2$, reference can be made to D. Palmer, P. Ziperovich, R. Wood and T. D. Howell, 'Identification of Nonlinear Write Effects Using Pseudorandom Sequences", IEEE Trans. Magn. Vol.MAG-23, No. 5 pp. 2377–2379, September 1987, particularly the appendix.

FIG. 1e shows a transition from $b_k$ to $b_{k+1}$ for an NRZ signal $b_{k+i}=\epsilon(-1, 1)$, which transition will be considered hereinafter. Moreover, use is made of transition symbols $q_{k+1}$ with:

$$q_{k-1}=\epsilon(-2, 0, 2) \text{ wherein } q_k=b_k-b_{k-1} \tag{5}$$

From (5) it can be derived that $q_k=+2$ for a rising transition, $q_k=-2$ and $q_k=0$ when there is no transition.

FIG. 1e illustrates the customary method of describing the first-order bit shift $\epsilon_1$, which presumes a constant signal $b_{k+1}=-1$ or $+1$ with a single symbol $b_k$ having the length of a symbol interval having a value opposite to that of the constant signal.

FIG. 1f illustrates the customary method of describing a second-order bit shift $\epsilon_2$, based on a constant signal $b_{k+1}$ $-1$ or $+1$ with two symbols $b_k$ and $b_{k-1}$ having the length of a symbol interval and both having a value opposite to that of the constant signal.

It can be inferred that the compensation for the time shift $\epsilon_1$ requires a precompensation $\Delta_1$ in accordance with Likewise, it follows that the precompensation for $\epsilon_2$ complies with:

Hence, the required total precompensation is:

$$\Delta_1 = -\epsilon_1 \frac{q_{k+1}q_k}{4} \tag{6}$$

$$\Delta_2 = -\epsilon_2 \frac{q_{k+1}q_{k-1}}{4}$$

$$\Delta_{tot} = -\frac{q_{k+1}}{4}\{\epsilon_1 q_k + \epsilon_2 q_{k-1}\}$$

It follows from (5) and (6) that:

$$\Delta_{tot} = -\frac{q_{k+1}}{4}\{\epsilon_1(b_k - b_{k-1}) + \epsilon_2(b_{k-1} - b_{k-2})\} \tag{7}$$

$$= -\frac{q_{k+1}}{4}\{\epsilon_1 b_k - (\epsilon_1 - \epsilon_2)b_{k-1} - \epsilon_2 b_{k-2}\}$$

$$= C + \frac{q_{k+1}}{2}\left\{\frac{\epsilon_1 - \epsilon_2}{2}b_{k-1} + \frac{\epsilon_2}{2}b_{k-2}\right\}$$

where $$C = \frac{-\epsilon_1}{4}(q_{k+1}b_k)$$

and $q_{k+1}b_k=-2$ in the case of a transition.

The constant precompensation $C=\epsilon_1/2$ which applies to all transitions may be ignored because only the shift of transitions relative to one another is relevant.

Since $q_{k+1}=2b_{k+1}$ when there is a transition, it therefore holds that $q_{k+1}/2=b_{k+1}$ so that, after dropping the constant C, it holds that $$\Delta = b_{k+1}\left\{b_{k-1}\frac{(\epsilon_1 - \epsilon_2)}{2} + b_{k-2}\frac{\epsilon_2}{2}\right\}$$

As a matter of fact, this expression is of the same structure as (4), where $c_1$ and $c_2$ can be identified as $(\epsilon_1-\epsilon_2)/2$ and $\epsilon_2/2$.

Figure 4:
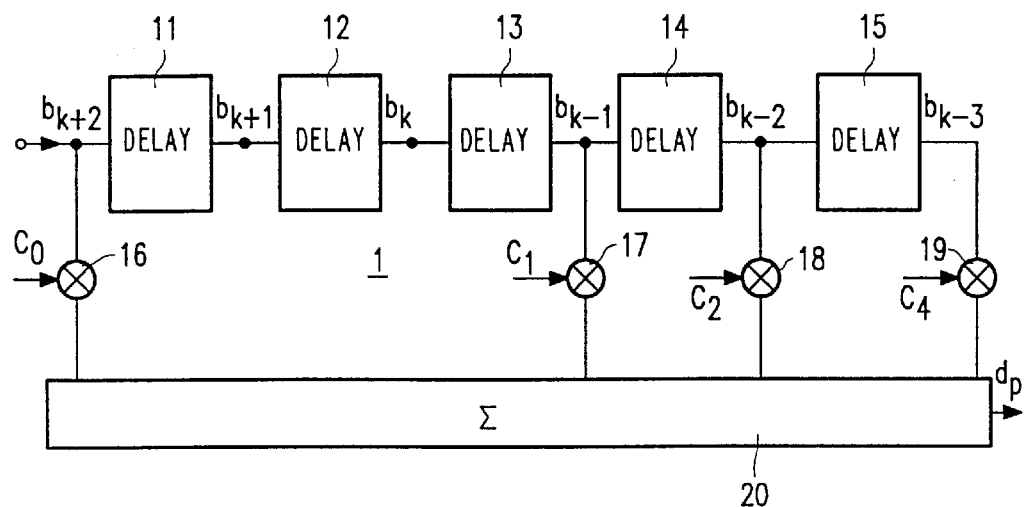
FIG. 4 is a block diagram of a device in accordance with the invention.

The precompensation in accordance with (4) can be realized, for example, by means of a transversal filter as shown in FIG. 4.

This filter comprises four delay stages, which each delay the signal applied to the input by one bit interval. The delay stages may comprise, for example, in known manner series-connected flip-flop circuits 11–15 clocked by a clock signal which is in synchronism with the bit intervals.

The signals $b_{k+2}$ through $b_{k-3}$ appear on the respective inputs and outputs of the flip-flop circuits 11–15. The output signal of the flip-flop 11 is applied to a summing circuit 20 via a multiplier 16, in which the signal $b_{k+2}$ is multiplied by the weighting factor $c_0$. In a similar way, the output signal $b_{k-1}$ of the flip-flop 13 is multiplied by the weighting factor $c_1$ by means of a multiplier 17, the output signal $b_{k-2}$ of the flip-flop circuit 14 is multiplied by the weighting factor $c_2$ by means of a multiplier 19, and the output signal $b_{k-3}$ of the flip-flop 15 is multiplied by the weighting factor $c_3$ by means of a multiplier 19. The output signals of the multipliers 17, 18 and 19 are also applied to the summing circuit 20.

Thus, if the weighting factors are correct, a signal dp is available on the output of the summing circuit 20, which can provide a compensation signal for all the currently known non-linear non-linear bit shifts. In order to realize the actual compensation in accordance with equation (4) this also requires a multiplication by $-b_k$ as well as a variable delay, which is determined by the result of the multiplication of dp by $-b_k$. In accordance with to the invention these two steps are replaced by a simpler equivalent operation in accordance with the diagram of FIG. 5. Here, the transversal filter of FIG. 4 is represented diagrammatically as the block 30. This also indicates that, although a transversal filter is a practical and easy to implement solution for obtaining a suitable signal dt, other solutions are also possible. For example, it is also possible to use for the filter 30 an analog filter, a RAM filter or a table filter. A RAM filter or a table filter can supply a predetermined value for dt on the basis of the variation of the bit sequence $b_{k+j}$. An additional advantage of such filters can be that, it also enables other effects leading to bit shifts to be compensated for. Moreover, it is possible to use a combination of different filter types. It will be obvious to those skilled in the art how a RAM filter or table filter can be implemented in the present case.

FIG. 5 further shows an integrator/limiter circuit 31 to whose input the data signal $b_{k+1}$ to be recorded, which is shown in FIG. 6a, is applied and whose output supplies the signal shown in FIG. 6b. This signal is in synchronism with the data signal but the transitions therein have each been replaced by substantially linearly rising or falling slopes. To select the slope, i.e. the integration constant, it is important that the maximum value, the limit value $V_0$, is reached within a single bit period of the data signal, so as to ensure that the desired trapezium shape is also obtained for signals having a duration of only one bit period. This means that in the case of a data signal with a higher clock frequency the slope of the signal in the circuit 31 should be steeper. This can be achieved, for example, by coupling the integration circuit to the circuit for generating the clock signal in such a manner that, via circuit matching in an integrated circuit, a higher clock frequency results in a shorter integration time constant.

The output signal of the integrator/limiter circuit 31 is applied to one input of a comparator 32 whose other input receives the output signal of the filter 30, which signal is shown in FIG. 6c. For each symbol interval the output signal of the filter 30 is compared with the signal from the circuit 32 and when both signals are identical the comparator output is inverted, as a result of which a transition is produced in the output signal. The afore-mentioned multiplication of dp by the signal $b_{k+1}$ is obtained implicitly in that the output signal of the integrator/limiter circuit has a positive slope for up-going data transitions and a falling slope for down-going data transitions, as a result of which the signal at the output of the comparator exhibits a time shift with the correct polarity. FIG. 6d shows this output signal $b'_{k+1}$ of the comparator 32, which is a signal having a bit pattern similar to that of the data signal in FIG. 6a but in which, where necessary, the transitions have been shifted to compensate for non-linear bit shifts. If desired, the difference between the output signals of the limiter and the filter may be determined before the comparator, the resulting signal being subsequently compared with a reference signal by means of the comparator.

If by means of the circuit shown in FIG. 5 should also be capable of compensating for non-linear bit shifts as a result of partial erasure, the bit $b_{k+2}$ should be available at the filter 30, as described above, at the instant at which the integrator/limiter circuit processes the bit $b_{k+1}$, i.e. the output signal of the integrator/limiter circuit should be delayed with respect to the input signal of the filter 3. This is possible by including a delay stage 33 in the branch to the integrator/limiter circuit 31, which stage delays the signal applied to this circuit by one period of the clock signal. If the influence of the partial erasure effect is very large, the signal to the integrator/limiter circuit 31 can be delayed by a plurality of clock periods in order to ensure that the signals $b_{k+3}$, $b_{k+4}$ etc. are also available. The filter 30 should then comprise further delay stages and multipliers so as to enable each of these signals to be weighted before they are applied to the summing circuit 20.

As is apparent from the foregoing, an important aspect of the present invention is that with the output signal dt an arbitrary number of desired time shifts can be obtained rather than that, as in the prior art, merely a choice can be made from a limited number of delay values. The signal dt can be amplitude-discrete but also analog.

We claim:

1. A device for write precompensation of data signals to be recorded on a magnetic medium, which device has an input for receiving input data signals and an output for supplying output data signals to be recorded, at least some of the signal transitions in these output data signals being delayed with respect to the corresponding signal transitions in the input data signal, characterized by an integrator/limiter circuit which receives the input data signals and which supplies an output signal which is in synchronism with the data signal and whose amplitude varies substantially linearly as a function of time the amplitude being limited within a data symbol interval; an adjustable filter which receives the input signals and supplies an output signal whose instantaneous values depend on the pattern of preceding and/or future signal transitions in the data signal; and a comparator circuit which through comparison of the output signal of the integrator/limiter circuit and the output signal of the filter produces the output signal in which at least some signal transitions of the input data signal can be shifted in time.

2. A device as claimed in claim 1, characterized in that the signal path of the integrator/limiter circuit includes means for delaying the input data signal by at least one data symbol interval.

3. A device as claimed in claim 2, characterized in that for determining the time shift in the signal transition from a symbol $b_k$ to a symbol $b_{k+1}$ in the data signal the symbols $b_{k+1}$, $b_{k-1}$ and $b_{k-2}$ are used, where $b_{k+j}=\epsilon(+1, -1)$.

4. A device as claimed in claim 2, characterized in that the filter comprises a table filter.

5. A device as claimed in claim 2, characterized in that the filter comprises a RAM filter.

6. A device as claimed in claim 2, characterized in that the filter comprises an analog filter.

7. A device as claimed in claim 2, characterized in that the filter comprises a transversal filter in which each of a predetermined number of bit values is multiplied by an adjustable weighting factor and the multiplication results are summed in order to obtain the output signal of the filter.

8. A device as claimed in claim 7, characterized in that for determining the time shift in the signal transition from a symbol $b_k$ to a symbol $b_{k+1}$ in the data signal the symbols $b_{k+1}$, $b_{k-1}$ and $b_{k-2}$ are used, where $b_{k+j}=\epsilon(+1, -1)$.

9. A device as claimed in claim 7, characterized in that the filter comprises a table filter.

10. A device as claimed in claim 7, characterized in that the filter comprises a RAM filter.

11. A device as claimed in claim 7, characterized in that the filter comprises an analog filter.

12. A device as claimed in claim 1, characterized in that the filter comprises a transversal filter in which each of a predetermined number of bit values is multiplied by an adjustable weighting factor and the multiplication results are summed in order to obtain the output signal of the filter.

13. A device as claimed in claim 12, characterized in that for determining the time shift in the signal transition from a symbol $b_k$ to a symbol $b_{k+1}$ in the data signal the symbols $b_{k+1}$, $b_{k-1}$ and $b_{k-2}$ are used, where $b_{k+j}=\epsilon(+1, -1)$.

14. A device as claimed in claim 12, characterized in that the filter comprises a table filter.

15. A device as claimed in claim 12, characterized in that the filter comprises a RAM filter.

16. A device as claimed in claim 12, characterized in that the filter comprises an analog filter.

* * * * *

Disclaimer

6,091,558 — Johannes O. Voorman, Eindhoven (NL); Johnannes W. M. Bergmans, Eindhoven (NL); Hendrik J. Pothast, Eindhoven (NL). DEVICE FOR WRITE COMPENSATION IN MAGNETIC MEDIA RECORDING. Patent dated July 18, 2000. Disclaimer filed March 28, 2008, by the assignee, U.S. Philips Corporation.

Hereby enters this disclaimer to all claims of said patent.

*(Official Gazette, April 7, 2009)*